United States Patent [19]

Bowman et al.

[11] Patent Number: 4,491,473

[45] Date of Patent: Jan. 1, 1985

[54] METHOD OF OPERATING METALLIC SCRAP TREATING FURNACE TO FRAGMENT AND SEGREGATE METALLIC COMPONENTS THEREIN

[75] Inventors: Kenneth A. Bowman, Allegheny Township, Westmoreland County, Pa.; Chester L. Zuber, Evansville, Ind.

[73] Assignee: Aluminum Company of America, Pittsburgh, Pa.

[21] Appl. No.: 553,100

[22] Filed: Nov. 18, 1983

[51] Int. Cl.³ .............................................. C22B 21/00
[52] U.S. Cl. ...................................... 75/63; 75/68 R; 241/14
[58] Field of Search ............... 241/14, 23; 75/68 R, 75/63

[56] References Cited

U.S. PATENT DOCUMENTS

| | | | |
|---|---|---|---|
| 3,736,896 | 6/1973 | Osborn, Jr. et al. | 113/1 K |
| 3,873,305 | 3/1975 | Claxton et al. | 75/68 R |
| 4,016,003 | 4/1977 | Stauffer | 134/19 |
| 4,128,415 | 12/1978 | Van Linden et al. | 75/65 R |
| 4,269,632 | 5/1981 | Robertson et al. | 148/2 |
| 4,330,090 | 5/1982 | Montagna et al. | 241/14 |
| 4,373,675 | 2/1983 | Kaufman | 241/23 |
| 4,411,695 | 10/1983 | Twyman | 75/68 R |

OTHER PUBLICATIONS

"Process Equipment and Systems for the Aluminum Recycling Industry" by APROS.

Primary Examiner—M. J. Andrews
Attorney, Agent, or Firm—Andrew Alexander; John P. Taylor

[57] ABSTRACT

A rotatable furnace for treatment of metallic scrap is fed metallic scrap comprising at least two metallic components having different incipient melting temperatures. The furnace is heated to a temperature at least equal to the lowest incipient melting temperature of the metallic components but less than the incipient melting temperatures of other components in the scrap while rotating the furnace to agitate the scrap. The combination of heating to the incipient melting temperature and agitating the scrap serves to fragment the metallic component having the lowest incipent melting temperature. The scrap is then removed from the furnace, and the scrap is segregated by particle size. Fines representing dirt and other impurities may also be separated therefrom.

21 Claims, 10 Drawing Figures

METHOD OF OPERATING METALLIC SCRAP TREATING FURNACE TO FRAGMENT AND SEGREGATE METALLIC COMPONENTS THEREIN

BACKGROUND OF THE INVENTION

This invention relates to scrap recovery. More particularly, this invention relates to a method of operating a scrap treating furnace for the separation and recovery of metallic components of metallic scrap having different incipient melting temperatures.

Recycling of materials, such as steel or aluminum used in the packaging and automotive industries, has become increasingly important as energy and material costs continue to rise. However, in such fields, it has become the practice to use more than one type of metal or metal alloy in the device, e.g. an aluminum lid in a beverage can and a steel body or an aluminum can body comprising a different alloy than the lid.

This usage of different metallic components in a container or the like has economically hampered the recycling of such devices. For example, attempts to recycle a beverage can having a body fabricated from one aluminum alloy and a top or lid constructed from a different aluminum alloy may result in a melt having the composition of neither alloy.

The reuse of such recovered aluminum may then necessitate purification, realloying or costly dilution with pure aluminum or other alloying constituents to arrive at a useful ratio of alloy constituents, i.e., a particular alloy useful in a given application. This greatly reduces the value of the melted recycled metal since it cannot be reused, for example, as a can body or can lid without major dilutions, purifications, realloying or other modification.

The problem of segregation of different alloys is recognized in U.S. Pat. No. 3,736,896, where there is disclosed the separating of aluminum alloy tops or lids from steel bodied cans by melting a small band of aluminum around the periphery of the can body to provide a separating area allowing separation of the aluminum end from the steel cylindrical body. In this disclosure, induction heating is used to melt the band wherein an encircling inductor surrounds a bead and is connected to a high frequency power supply. However, this approach seems to presume that used beverage can are not usually crushed and the ends remain perfectly circular. Further, to melt the ends off in this manner would not seem to be economical since the ends would have to be removed individually.

In U.S. Pat. No. 4,016,003, containers having aluminum alloy bodies and lids are shredded to particles in the range of 1 to 1½ inch and then subjected to temperatures of around 700° F. to remove paints and lacquers. In addition, U.S. Pat. No. 4,269,632 indicates that since the conventional alloys for can ends, e.g., Aluminum Association (AA) alloy 5182, 5082 or 5052, and for can bodies, e.g., AA 3004 or 3003, differ significantly in composition, and in the manufactured can, the end and body are essentially inseparable and that an economical recycle system requires the use of the entire can. U.S. Pat. No. 4,269,632 further notes that the recycling of cans results in a melt composition which differs significantly from the compositions of both the conventional can end and can body alloys. In this patent, it is suggested that both can end and body be fabricated from the same alloy to obviate the recycling problem. With respect to can ends and bodies made from AA 5182 and 3004 it is indicated that normally pure aluminum must be added regardless of the alloy prepared.

Recyclable scrap metal also may contain decorative or protective coatings thereon which may contain elements, such as titanium. Titanium, in high levels, is not normally desirable in many alloys, such as alloys used in the manufacture of aluminum beverage can bodies or lids. It is, therefore, desirable to remove such coatings prior to melting of the recyclable scrap to avoid the dilution, purification and realloying problems previously mentioned.

The coatings may be removed by a solvent delacquering step or they may be removed by thermal treatment. One such thermal treatment comprises feeding the scrap into a rotary kiln or furnace which passes hot flue gases therethrough to heat the scrap to a temperature of about 538° C. (1000° F.) while agitating the scrap to provide uniform heating and maximum heat transfer. Apparatus specifically designed for this purpose is manufactured by APROS (Automated Production Systems Corporation) comprising a rotary kiln heated by flue gases from a combustion chamber.

Conventionally, scrap, such as aluminum scrap, after such removal of coatings, is melted without any attempt to segregate the scrap by various alloys of a given metal, e.g., without attempting to segregate aluminum can lids from can bodies.

It would be advantageous to have a method whereby scrap could be easily segregated or divided into components by alloy type. In this manner, each component could be separately melted and refabricated in accordance with normal procedures without, inter alia, expensive dilutions or purification steps.

SUMMARY OF THE INVENTION

It is, therefore, an object of this invention to provide a method for treating in a rotating furnace components of metallic scrap having different incipient melting temperatures.

It is another object of the invention to provide a method for treating components of metallic scrap in a rotating furnace by heating the scrap to a temperature at least equivalent to the lowest incipient melting temperature of the metallic components.

It is yet another object of the invention to fragment the component of the metallic scrap having the lowest incipient melting temperature by heating the scrap in the furnace to the lowest incipient melting temperature while rotating a portion of the furnace to agitate the scrap.

It is a further object of the invention to separate the fragmented scrap by particle size whereby the fragmented component may be segregated from other portions of the scrap.

These and other objects of the invention will be apparent from the drawings and description of the invention.

In accordance with the invention, a process for operating a scrap treating furnace to permit segregation of components of metallic scrap having different incipient melting temperatures comprises feeding into a rotatable furnace metallic scrap comprising at least two metals having different incipient melting temperatures, heating the furance to a temperature at least equal to the lowest incipient melting temperature of the metal components but less than the incipient melting temperatures of other components in the scrap, rotating at least a portion of the furnace to agitate the scrap whereby the metal component having the lowest incipient melting temperature will fragment into smaller particles, removing the scrap from the furnace, and segregating the scrap by particle size whereby the metal component having the lowest incipient melting temperature will be separated from the remainder of the scrap because of the prior fragmentation within the furnace of this metal component.

DETAILED DESCRIPTION OF THE PREFERRED EMBODIMENT

Referring to the flow sheet, used articles from which the metal components are to be recovered or reclaimed may comprise containers having one or more aluminum alloys, such as food and beverage containers. Scrap materials to which the process is particularly suited are used beverage containers comprised of two different aluminum alloys. From the flow sheet, it will be noted that the articles to be recovered may be subjected to preliminary sorting to remove materials which would contaminate the aluminum alloy to be recovered. For example, it would be desirable to remove glass bottles and steel cans, such as used for food, for example. Further, it is desirable to remove other materials, such as dirt and sand, etc., in order to cut down on the amount of silicon, for example, that can occur in the reclaimed alloy. Elimination of these materials can permit use of the alloy reclaimed in accordance with the present invention without further purification procedures. The removal of steel preliminarily, as may be present in the form of containers or cans or other sources, aids in keeping the iron in the reclaimed alloy to a level which does not adversely affect the reclaimed alloy properties.

When the materials to be reclaimed are food or beverage containers, these are normally packaged in bales for shipping purposes; and, therefore, prior to the sorting step, the bales would normally be broken apart to remove the foreign materials.

Figure 1:
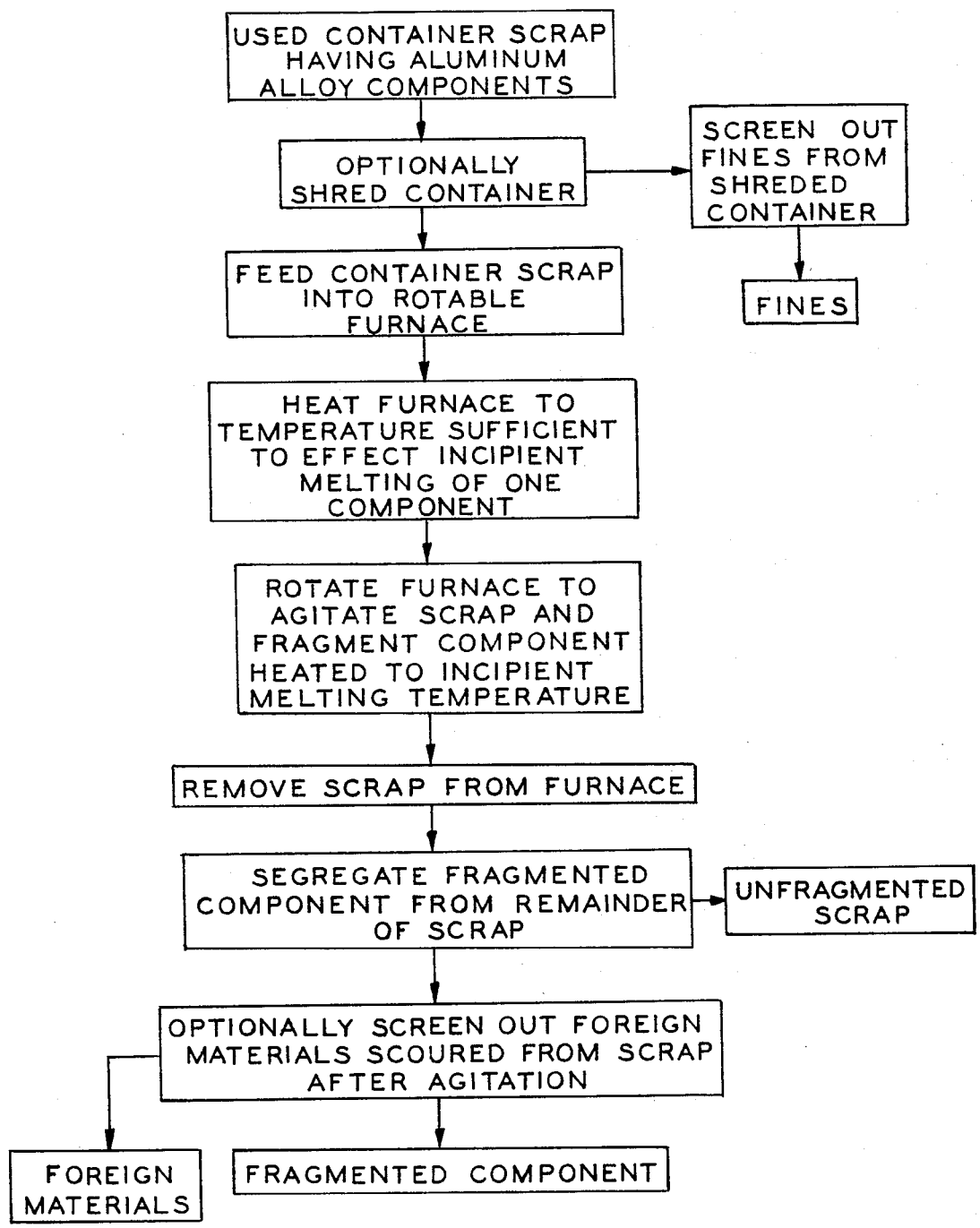
FIG. 1 is a flowsheet illustrating the process of the invention.

The bales may be optionally subjected to a shredding type operation for purposes of breaking them apart. After the shredding operation, the feedstock should be screened for purposes of removing metal fines for purposes set forth in detail hereinbelow. As shown in FIG. 1, the fines may be subjected to a delacquering step and then recombined with a compatible fraction of the feedstock in accordance with the invention and eventually melted.

After the optional shredding and screening step, the shredded feedstock may be subjected to a delacquering step. This may be accomplished by solvent or thermal treatments. The delacquering removes the coatings, such as decorative and protective coatings, which, if not removed from the cans, cause decreased metal recovery when the cans are melted. When solvent delacquering is used, it is usually desirable to shred or pierce the containers in order to permit the solvent to drain therefrom. When the coatings are removed by thermal treatments, the temperature used in normally in the range of 600° to 1000° F.

While the foregoing delacquering step may be carried out as an independent step, either by the use of chemical delacquering or by a preheating to the above recited thermal delacquering temperature range, in a preferred embodiment, the delacquering is carried out in the rotary kiln during the heating of the metal scrap to effect incipient melting of the component having the lowest incipient melting temperature. This is made possible due to the fact that the thermal decomposition temperature of the coating will in most, if not all instances, be lower than the incipient melting temperature of any of the metal components in the scrap.

Figures 2, 2A:
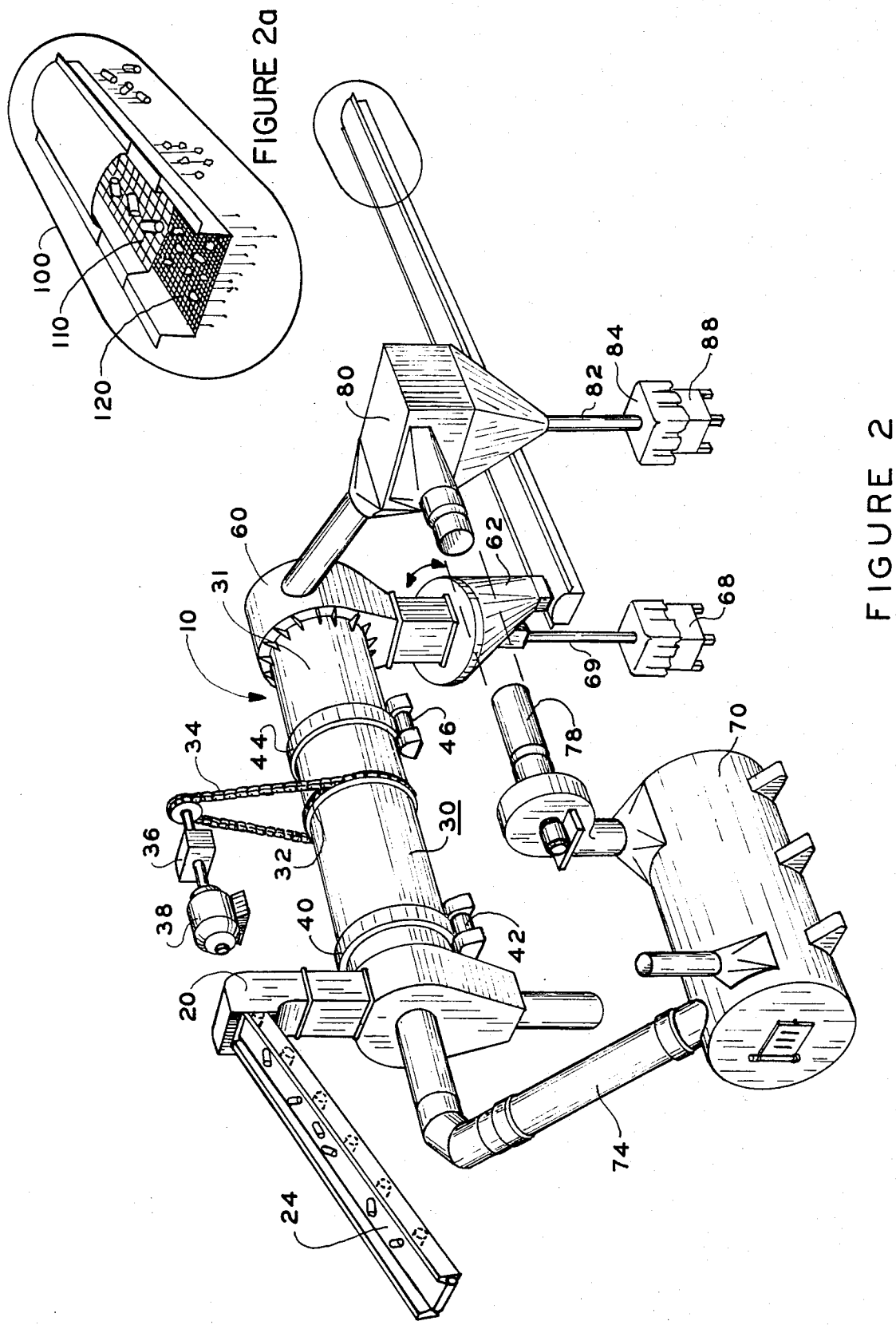
FIG. 2 is an isometric view of apparatus used in the process of the invention.
FIG. 2a is a fragmentary isometric view of a portion of the apparatus in FIGS. 4 and 5.

After the initial sorting and optional shredding of the metallic scrap, the scrap is charged to a rotating furnace or kiln apparatus which is generally designated at 10 in FIG. 2. The scrap is loaded into a hopper-like portal 20 via a conveyor belt 24 onto which the scrap is placed after the initial sorting step and optional shredding. Hopper or portal 20 is operationally connected to one end of a preferably substantially horizontally disposed rotatable drum 30 into which the scrap passes together with hot gases from a combustion chamber 70 which are carried by a flue 74 into hopper 20. Rotatable drum 30 may be placed so as to have a slight decline, e.g. 1°–12° from its entrance end to its exit end.

Figure 3:
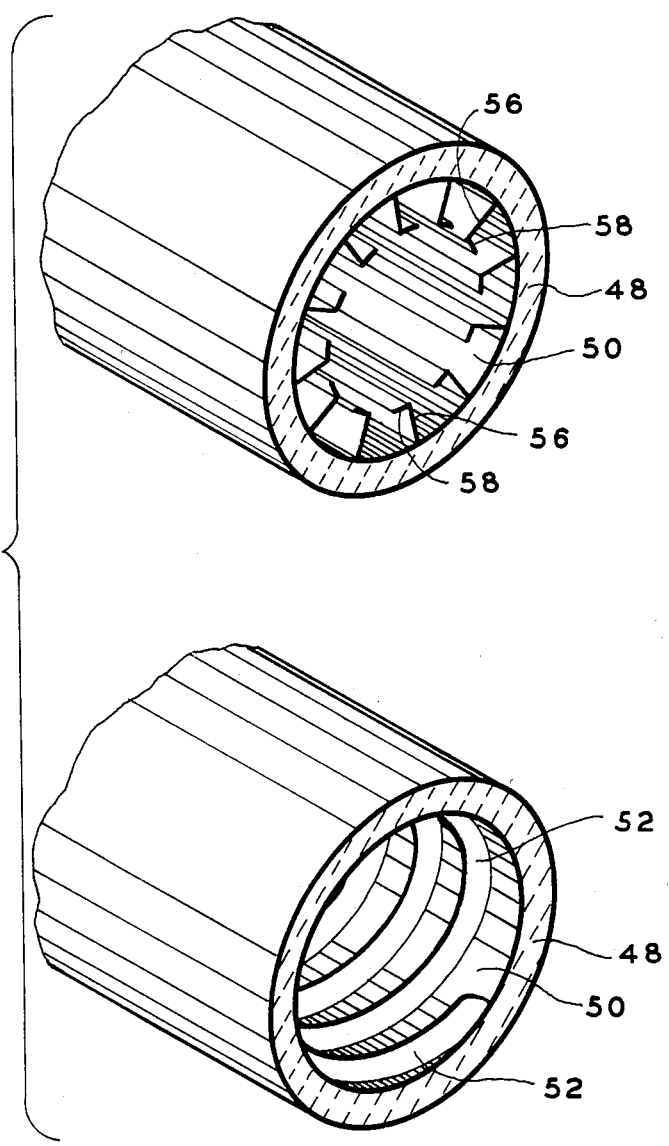
FIG. 3 is a fragmentary isometric view of a portion of the apparatus of FIG. 2.

A belt or chain 34 driven by a motor 38 through a gearbox 36 engages a pulley or sprocket 32 on drum 30 to rotate drum 30. Drum 30 is fitted with tire bands 40 and 44 which respectively ride in trunion assemblies 42 and 46 to support drum 30 as it rotates. To facilitate this support arrangement as well as conserve fuel, the heat of the furnace is isolated from outer wall 31 by an insulating layer of refractory brick 48 which is placed around the inner periphery of drum 30 and held in place by an inner wall or shell 50 (FIG. 3).

The rotation of drum 30 serves to agitate the scrap therein as well as to move the scrap through the furnace. As shown in FIG. 3, the movement of the scrap through the furnace by rotation of the scrap is facilitated by a screw or worm construction 52 on the inner wall 50 of drum 30 which serves to move the scrap through the furnace. The rotational speed of the furnace, together with the pitch of the spiral, should be such as to permit a residence time for the scrap in the furnace of from 30 seconds to less than 10 minutes.

The agitation of the scrap within drum 30 is further expedited by the provision of a series of lifters comprising dog leg or L-shaped lifter members 56 radially spaced around inner wall 50 of drum 30. The depending leg 58 of lifter member 56 depends toward the direction of rotation whereby the scrap is picked up by lifter member 46 in a scooping action and then showered down as the lifter member reaches the top of horizontally mounted drum 30. This tumbling effect of the scrap aids in fragmentation of the scrap component which is at its incipient melting temperature, as will be further described.

As mentioned previously, drum 30 is heated by flue gases fed into hopper 20 via flue pipe 74 from combustion chamber 70. The temperature of the flue gas is adjusted to provide a temperature within drum 30 at least equal to the incipient melting temperature of the metal component in the scrap having the lowest incipient melting temperature but less than the incipient melting temperature of the component having the next higher incipient melting temperature. The flue gases in combustion chamber 70 may be heated using fuel oil or natural gas or any other convenient and economical source of energy.

The flue gases pass through drum 30 and out via an exit pipe 76 into a hopper 80 where any fines carried with the gases may be separated and passes by a discharge pipe 82 through a fabric filter 84 to a tote bin 88. The flue gases are then recycled back to combustor 70 via pipe 78.

The scrap passes through drum 30 to an exit port or hopper member 60 which includes a chute member 62 and a side discharge pipe 64 through which fines or dust mixed with the scrap passes into a tote bin 68 through a fabric filter 66.

Figure 4:
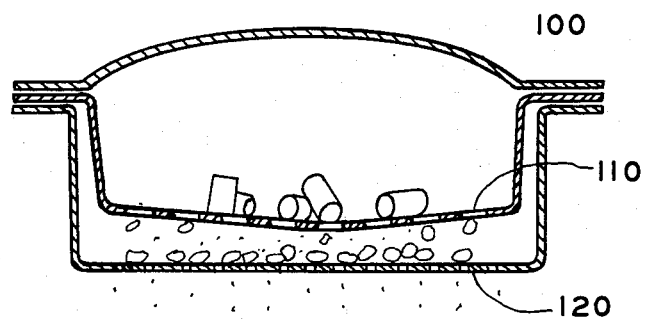
FIG. 4 is a cross-sectional end view of a portion of the apparatus of FIG. 2.
Figure 5:
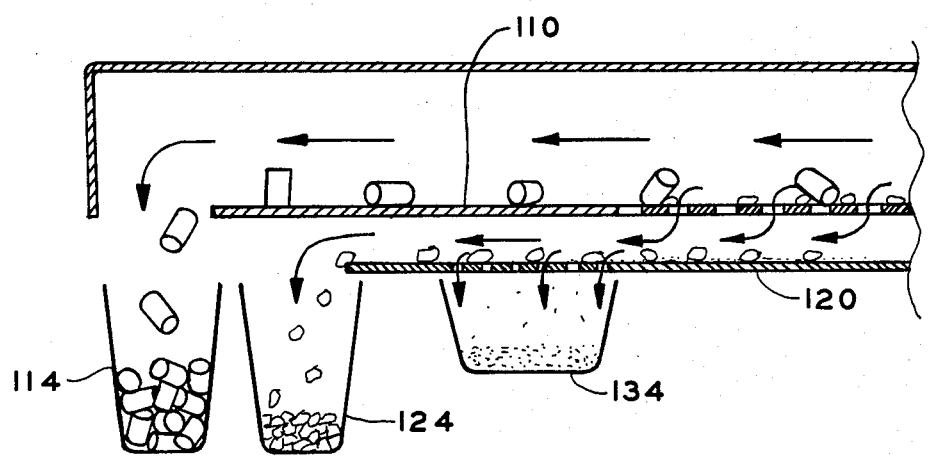
FIG. 5 is a cross-sectional side view of a portion of the apparatus of FIG. 2.

The partially fragmented scrap is fed through chute 62 to a separator 100 comprising a pair of conveyors 110 and 120 juxtapositioned over one another and having different sized openings therein. As best seen in FIGS. 4 and 5, upper conveyor 110 is provided with openings large enough to permit passage therethrough of the fragmented pieces of the metal component having the lowest incipient melting temperature. The remaining, unfragmented portions of the scrap are carried by conveyor 110 to a bin 114. These portions of the scrap may be melted down to recover the metal represented by the scrap components having one or more higher incipient melting temperatures. However, if desired, these portions may be subjected to a further separation and fragmentation step if desired and if more than two components are initially present in the scrap. The conveyors can be of the belt type, but shaker pans and trays are preferred.

The fragmented portions of the scrap, as well as fines and/or dirt, such as silicon, pass through the openings in conveyor 110 onto conveyor 120. Conveyor 120 is also provided with openings sufficiently large to permit passage of the dirt or fines therethrough while retaining the fragmented portions thereon. The fragments then are carried by conveyor 120 to a bin 124 where the fragments may be collected and passed to a melting furnace. The fines and/or dirt passing through conveyor 120 are collected in a bin 134 for further processing or disposal, as the case may be.

As previously discussed, the scrap is heated to a temperature at least equal to the incipient melting temperature of the scrap component having the lowest incipient melting temperature. This temperature, also known as the grain boundary melting temperature of an alloy, is that temperature at which the alloy becomes fracture sensitive. Temperatures higher than this may be used in some instances provided that the temperature remains below the incipient melting temperature of the other component or components to achieve the desired separation via fracturing. However, as will be discussed below with respect to beverage cans, care must be taken to avoid raising the temperature high enough to cause melting of the metal which could result in trapping of fines, dirt, etc., as well as other problems.

Thus, by the use of the terms "incipient melting temperature" or "grain boundary melting temperature" herein is meant the lower temperatures of the melting range or phase melting range and slightly below at which the alloy develops or significantly increases in fracture sensitivity or at which fragmentation of the alloy can be made to occur without the use of great force. That is, in the fracture sensitive condition, fragmentation can be made to occur by the use of a tumbling action or falling action, and the use of forces such as would be obtained by a hammer mill or jaw crushers are not required. Forces such as encountered with a hammer mill or jaw crusher are detrimental to the instant process since they act to crush the containers, for example, thereby trapping material to be separated. It will be appreciated that many alloys have different incipient melting temperatures. For example, beverage can body alloy AA 3004 has an incipient melting temperature of about 1165° F. while beverage lid alloy AA 5182 has an incipient melting temperature of about 1077° F. and has a phase melting range of about 1077° to 1178° F. However, it will be appreciated that this range can vary depending to a large extent on the exact composition of the alloy used. Incipient or grain boundary melting of the alloy greatly reduces its strength and sets up the fracture condition. Thus, the AA 5182 lids can be detached or removed from the AA 3004 bodies because of the lids being provided in a condition which makes it highly sensitive to fracture and fragmentation. While in this condition, energy, e.g., tumbling action, can be applied for purposes of detaching or removing the lid from the can body. The detaching results primarily from the lid fracturing or fragmenting to provide lid particles which are not only smaller than the can body but generally smaller than a lid.

Thus, after the detaching step, there results a charge or mass comprised of can bodies and fragmented lids, the can bodies being comprised of an alloy or material different from the fragmented lids, the fragmented lids having a particle size distribution substantially different from the can bodies. Thus, it can be seen that not only it is important to remove the lid from the can body, but the lid fragments must have a particle size which is substantially different from the can body. For purposes of obtaining a product or alloy which is not adversely contaminated with the alloy with which it is commingled, the charge is subjected to a treatment for purposes of classifying or segregating the particles. When this aspect of the process is carried out, the result is lid fragments or values comprised of substantially the same alloys which are segregated from the can bodies.

While the process has been described and illustrated in general terms with respect to reclamation of used beverage cans, it should be understood that the feedstock for the process is not necessarily limited thereto. That is, the process is capable of classifying aluminum alloys, particularly wrought alloys, where one of the alloys can be made fracture sensitive or put in a condition where one of the alloys can be fragmented preferentially in order to obtain a particle size distribution which is different from the particle sizes of the other alloys. In this way, a partition of the alloys can be made.

Thus, for example, the feedstock for reclamation may be comprised of used beverage containers having bodies fabricated from AA 3004 and lids fabricated from AA 5182. Other alloys which may be used for lids include AA 5082, 5052 and 5042 (Table X). However, other alloys which may be used for food or beverage can bodies include alloys, such as AA 3003, 3104, 5042 and 5052 (Table IX). If such alloys are high in magnesium, for example, it is required that such can bodies be fractured or fragmented sufficiently to enable them to be classified with the lid alloys, such as AA 5182. Thus, it will be understood that the process of the present invention is not only capable of removing and classifying lids from can bodies, as noted herein, but it is also capable of classifying the alloys in the can bodies with the lids when the alloys are of similar composition and which respond in a similar manner with respect to fracture or fragmentation characteristics, as explained herein.

In addition, where the containers have bodies and lids fabricated from the same alloy, that too may be reclaimed by classifying in accordance with the present invention. For example, if can body and lids are fabricated from sheet having the composition 0.1–1.0 wt.% Si, 0.01–0.9 wt.% Fe, 0.05–0.4 wt.% Cu, 0.4 to 1.0 wt.% Mn, 1.3–2.5 wt.% Mg and 0–0.2 wt.% Ti, the remainder aluminum, this would be classified in accordance with the invention. That is, if the feedstock to be reclaimed comprises used containers fabricated from mixed alloys, such as AA 3004, 5182, 5042, as well as the can body and lid alloy above, this alloy would be expected to be classified with the AA 3004 body stock because no incipient melting would occur when the temperature was sufficiently high to cause fracture of AA 5182 or 5042.

Likewise, if steel containers having AA 5182 lids attached thereto are present in the feedstock, the lids can be classified in accordance with the invention, and the steel bodies would be recovered with AA 3004 can bodies. The steel container bodies can be separated from the aluminum alloys with which they may be classified by magnetic separation means, for example, after the lids have been removed. If the steel bodied containers had lids which fractured at temperatures in the AA 3004 incipient melting range, then it would be necessary to heat the containers to a higher temperature as compared to AA 5182 to effect a separation of the lid from the steel body after which the steel bodies could be removed by magnetic separation, for example.

From the above, it will be seen that the process of the present invention is rather insensitive to the aluminum feedstock being recovered. That is, the process is capable of handling most types of aluminum alloys and is particularly suited to recovering and classifying wrought alloy products such as is encountered in used containers. If the scrap were comprised of aluminum alloys used in automobiles, for example, AA 6009 and 6010, as described in U.S. Pat. No. 4,082,578 herein incorporated by reference, where the use can be hoods and doors, etc., it may be desirable to subject such articles to a shredding action to provide a generally flowable mass. Or in recovering AA 2036 and 5182 from used automobiles, it may be desirable to shred such products and then effect a separation, as noted herein.

With respect to grain boundary melting or incipient melting of one of the aluminum alloy components to effect fracture sensitivity or fragmentation, it will be understood that this is an important step of the process and must be carried out with a certain amount of care.

Using the used beverage cans as an example again, it will be noted that temperature control is important in this step. That is, if the temperature is permitted to get too high, substantial melting, for example, of the AA 5182 lid could occur, which would result in losses with respect to aluminum and magnesium because of oxidation. Temperatures which bring about substantial melting of the metal normally should be avoided for the additional reason that it can result in coagulation of particles with molten aluminum to form a mass which is not readily flowable when compared to finer discrete particles. Further, molten aluminum can stick to the furnace and start building a layer of metal and particles therein which, of course, interferes with the efficiencies of the whole operation. Also, classification of the congealed mass becomes much more difficult, if not impossible. Lastly, on melting, fines, such as sand, glass, dirt and pigments or contaminants, such as silicon oxide, titanium oxide and iron oxide, tend to become embedded in the molten metal, further making separation thereof difficult. Thus, in view of the above it can be seen why temperatures which result in substantial melting of one of the aluminum alloy components should be avoided.

Likewise, when temperatures are employed which are too low, the fracture sensitivity of the lids drops dramatically and resistance to fragmentation increases substantially with the result that separation becomes extremely difficult and often segregation cannot be effected. Accordingly, it will be seen that it is important to have the temperature sufficiently high in order to remove the lid from the can body. For lids formed from AA 5182, this temperature correlates to about the incipient melting temperature which is about 1077° F. The melting range for AA 5182 is about 1077° to 1178° F. Thus, if the used beverage containers are heated to 1100° F., this is well below the melting range of AA 3004 (about 1165°–1210° F.), and the lids can be detached or removed without fracturing the can bodies.

With respect to grain boundary or incipient melting it will be understood that because the sheet from which the lids are fabricated has been rolled to a thin gauge, grains are not well defined. However, it is believed that recrystallization occurs when the used beverage containers are heated, for example, to remove lacquer, which can occur at 850° F., for example. Thus, grain boundary melting can occur.

When the used beverage containers were heated to about or slightly above 1100° F., generally it was found that the AA 5182 ends sagged or slumped on the AA 3004 can body. However, when the containers were agitated at about this temperature in the illustrated rotary furnace or kiln, the lids were found to detach themselves from the can bodies and were divided or fragmented in small particles while the can bodies were relatively unchanged. The temperature in the rotary kiln should be in the range of 1077° to about 1155° F., with a preferred range being 1077° to 1130° F. and typically not higher than 1120° F. Agitation sufficient to remove the ends in the rotary furnace can be that which occurs at these temperatures when the cans are tumbled inside the furnace as described. As noted hereinabove, forces, such as obtained from hammering or by the use of jaw crushers, should not be used because they act to flatten the cans or otherwise entrap the fragmented ends with the can bodies. As noted earlier, operating at temperatures high in the melting range can result in too much liquid metal and the attendant problems there-with. The melting problem becomes particularly acute if the used beverage cans are held for a relatively long time at temperatures high in the melting range. At temperatures in the range of 1077° to 1130° F., the time at temperature can range from 30 seconds to less than 10 minutes.

In the classification step, as illustrated, the AA 5182 fragments can be separated from whole can bodies or from can bodies which have been shredded by screening. However, it will be appreciated that other methods of separation may be used, all of which are contemplated to be within the purview of the present invention.

In another aspect of the invention, it has been found that contamination, such as clay, sand and glass, associated with used beverage cans, may be effectively removed in accordance with the present invention. That is, for purposes of recycling, it will be appreciated that contaminants, such as clay and sand, etc., can lead to higher levels of constituents, such as silicon in the recovered metal, than are permitted in the composition ranges of the alloy. Thus, in order to bring alloy compositions within specification, purification, substantial dilutions, or some form of realloying, must be made, all of which greatly detract from the economic feasibility of recycling. Accordingly, not only must the alloys of the different components, e.g., beverage cans, be separated according to alloy, but it is imperative that pickup of tramp impurities, such as silicon, be prevented because this also can result in an alloy which does not meet the specifications.

While reference is made mainly to clay or dirt, it will be understood that these materials can result in contamination in the form of calcium, sodium and silicon. The silicon often shows up in the form of silicon oxide. Other contaminants include iron, lead and oxides of aluminum, magnesium and titanium which often result from oxidation during treatment in the furnace. One source of $TiO_2$ is the coatings on the containers. For purposes of this invention, these impurities are referred to as tramp impurities since they are impurities picked up during or after usage of the containers and normally do not result from commingling of one alloy with another. However, tramp impurities are not necessarily limited to those impurities mentioned.

It will be appreciated that the addition of high purity aluminum to dilute out impurities, such as silicon, also interferes adversely with the economic feasibility of recycling. This problem is solved in the present invention by concentrating impurities, such as silicon, in a way which permits their removal from the system.

In the recycling of containers, such as used beverage and food containers, as noted earlier, it is customary to remove coatings, such as decorative and protective coatings, by heating. Thus, containers can be subjected to temperatures in the range of 600° to 1000° F., as noted earlier, to remove these coatings. However, while this treatment is suitable for removing coatings, it has the effect of baking clay or dirt on the container. Thus, upon remelting of delacquered scrap, the baked clay or dirt would be ingested in the melt, thus adding to the problems of obtaining a useful alloy. In the present invention, it has been discovered that the fracturing of the end aids in providing smaller particles which act to remove baked materials, such as clay or dirt, from the surface of the containers. It is believed that the removal of such material from the surface is achieved by scouring or scrubbing by the fine lid particles, for example, on the container body. Heating to the fracture sensitive condition in a rotary kiln in accordance with the invention causes scouring of the smaller particles on the outside of the larger bodies as the kiln turns.

It should be noted that not only is it important to remove baked clay or dirt materials from the containers, but the baked materials must be provided in a form which permits its separation from the feed materials. Thus, preferably this is accomplished by grinding the baked clay or dirt into a fine particle size. That is, the baked clay or dirt should be permitted to be ground to a particle size smaller than the smallest particle size of any recyclable components. Thus, for example, when the feedstock being recycled is mainly containers having an aluminum alloy body and an aluminum alloy lid or end, e.g., bodies fabricated from AA 3004 and lids fabricated from AA 5182, normally it is preferred that any contaminants resulting from the baked clay or dirt be separated from the container bodies with the fractured components. Thereafter, the ground clay or dirt may be separated from the fractured components, e.g., lids. That is, the operation of heating and agitating reduces the baked clay or dirt to a particle size which can be separated from the fractured lids, as shown in FIGS. 4 and 5. This separation may be effected by screening. Thus, in a preferred embodiment, the fine particles resulting from the baked clay can be effectively separated from the lids using a +20 mesh screen (U.S. Standard Series), for example, depending to a large extent on the amount of tramp impurities to be removed and balanced against the amount of fine metal particles present. It will be appreciated that other means for separation, e.g., air knife or flotation techniques, may be used and any such separation or the like is contemplated to be within the purview of the invention.

It will be appreciated that in the recovery of alloys, tolerance for elements, such as silicon, can vary depending on the alloy. For example, in high silicon alloys, silicon may not be considered to be an impurity. Thus, the use of silicon in the present invention is intended by way of example and not by limitation. Thus, in the following example, reference to silicon is made for purposes of illustration only.

In another aspect of the invention, it has been found important to remove metal fines from the process, preferably prior to fragmentation. That is, when it is found desirable to shred the aluminum articles, e.g., used aluminum materials, such as used containers, it has been found that shredding results in the generation of a significant amount of fine metal referred to herein as fines. Normally, the generation of such fines would not be considered to be a significant problem. However, when beverage containers are processed to separate the lids from the container bodies, the lids are fragmented, as noted herein, and have a size range substantially smaller than the bodies which permit separation therefrom. However, if the used materials, e.g., used beverage containers, are shredded prior to processing for separation purposes, the shredding can result in fines which are in the size range constituting the lid fragments. The fines generated by shredding, in fact, can be said to contaminate the fragmented portion. For example, if the beverage can is constituted of 75 wt.% AA 3004 and 25 wt.% AA 5182, the fines generated on shredding a feedstock comprised of such containers can have 93 wt.% of AA 3004 and only 7 wt.% AA 5182. Thus, it will be seen that there is a great need to prevent this type of contamination in the present process. Omitting the step of removing the fines results then in the fragmented AA 5182 portion being contaminated with AA 3004 fines from the can bodies. Thus, it has been found that removing fines in the size range corresponding to the size range of the fragmented portion being separated from the container body portion results in substantially fragmented portions being substantially free of fines. The fines should be removed after the shredding step and before the fragmenting step. One method of removing the fines can be the use of screens, although other techniques, such as air separation and the like, are contemplated within the purview of the invention.

When the feedstock used is beverage containers having, for example, AA 3004 bodies and AA 5182 lids, the fines, after shredding of the feedstock, can constitute 1 to 15 wt.% or more of the shredded feedstock.

In a test utilizing whole cans, the used beverage containers were processed in a test apparatus at about 1100° F. The fragmented end pieces were 25.3% of the delacquered can weight. The body parts represented 74.7%. This suggests that the alloy separation was nearly 100% effective. The two portions were melted and analyzed. The spectrographic results appear in Table VIII which may be compared to AA 5182 and 3004 (See Tables IX and X). These analyses further support that 100% separation of the two alloys is possible when the starting material is whole cans.

The following provides an example of the contamination which can result from the fines generated by shredding. From Table X, the composition range for manganese in AA 5182 is 0.20 to 0.50 wt.%. Normally, manufacturers of AA 5182 maintain the manganese composition near the middle of this range. For purposes of the following examples, it is to be assumed that manganese concentration of 0.38% is desired.

If the process of shredding and subsequent fragmentation is performed on 100 units of used beverage containers, it has been found in one instance that five units of fines generated in the shredding step had a manganese level of 1.10%. These are, therefore, composed almost entirely of AA 3004. The fragmentation step produced 20 units of AA 5182 with a manganese level of 0.38%. If these 25 units are not separated but are collected together, then the resulting manganese level can be calculated to be 0.52%. This requires significant dilution to produce metal of 0.38% manganese.

In yet another example, if the process produces a shredded product or feedstock that contains approximately 9 wt.% fines, the manganese level of this material is 1.05 wt.%. If these nine units were collected in the fragmented portion together with the 20 units of AA 5182, the total 29 units would have a manganese level of 0.59 wt.%. Again, this requires significant dilution with pure aluminum to produce AA 5182 having a manganese level of 0.38 wt.%. Thus, it can be seen that it is important to remove the fines prior to their being commingled with the fragmented portion.

As further illustrative of the invention, used beverage cans having AA 3004 bodies and AA 5182 lids thereon were processed through a rotary kiln of the type described. Samples were taken of ingoing and exiting material for the rotary kiln at four different kiln temperatures, as follows: 1060°, 1080°, 1100° and 1120° F. Ingoing samples were taken which weighed about 15 kg (35 lb). Approximately six minutes later, representing the residence time of used beverage cans in the kiln, about 45 kg (100 lb) of exiting material was sampled.

Prior to entering the kiln, bases of used beverage cans were processed through a shredder. The shredder, in the process of partially shredding most of the cans, generates some used beverage can fines. In the figures, the screen analyses of ingoing and exiting material are compared at each kiln temperature to determine the degree to which end fragmentation occurs inside the kiln. This is recognized as a decrease in weight of the coarser fractions and an increase in weight of the finer fractions.

The U.S. Standard Screen sizes that were used to fractionate the samples are listed in Table I, together with the Tyler mesh equivalents.

Samples of each size fraction were melted and analyzed to monitor alloy partitioning and also to measure the amount of tramp impurity pickup.

The chemical composition of a sample makes it possible to calculate the relative amount of AA 3004 and 5182 present. This is done by assuming that AA 3004 contains 1.10% manganese and that AA 5182 contains 0.38% manganese. A melt of used beverage cans having a manganese content of 0.92% can be shown to contain 75% of AA 3004 material and 25% of AA 5182 material. This calculation was done for each exiting fraction at the four kiln temperatures of the test. The amount of AA 5182 calculated to be present appears as the totally shaded portion on the bar graphs in FIGS. 6–9.

Figure 6:
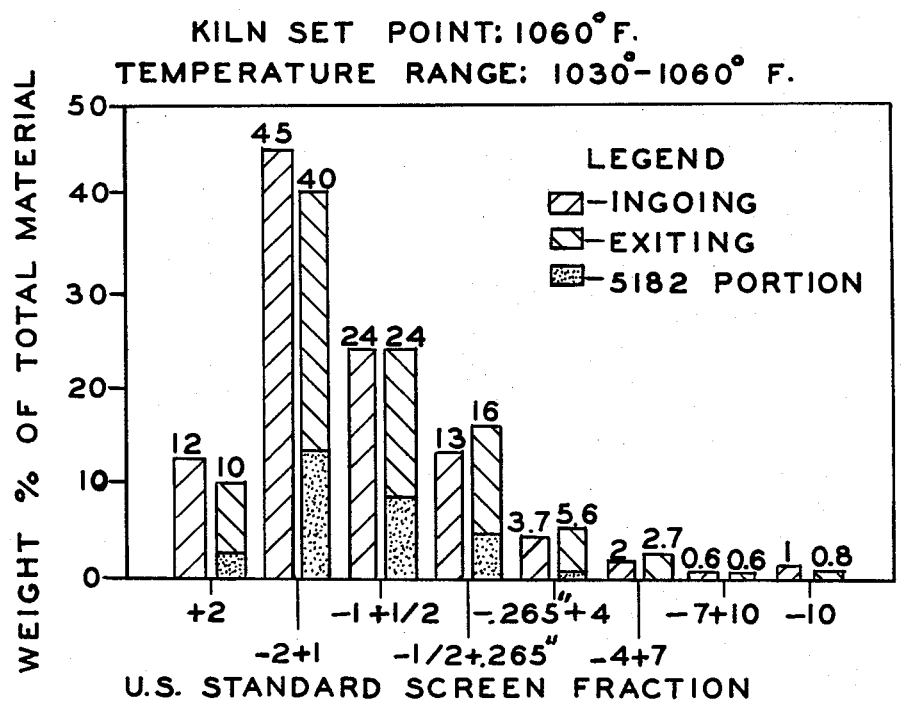
FIG. 6 is a bar graph showing the particle size distribution of material entering and exiting the furnace at a temperature of 1060° F.

FIG. 6 shows the particle size distribution of ingoing and exiting material while the kiln set temperature was 1060° F. The distribution of AA 5182 in the exiting material is also shown. The recorded temperature during the sampling period ranged from 1030° to 1060° F. The primary feature in the Figure is that very little difference is seen in the size distribution of ingoing and exiting material. It is also shown that the mix of AA 5182 and 3004 in the coarser exiting fractions is approximately 25% and 75%, respectively, which indicates that lid fragmentation did not appear to be occurring at this temperature.

Table II shows the spectrographic analysis of the metal found in each size fraction for both entering and exiting material. Again, ingoing and exiting material for a given size fraction appear to be very similar, except for magnesium.

There does, however, appear to be a variation in composition that is dependent on size fraction which suggests that the crushing step, prior to delacquering, generates more body fines than end fines. The finer fractions exhibit elevated manganese levels and decreased magnesium levels when compared to the coarser fractions. These finer fractions, therefore, appear to be richer in AA 3004 content than the coarser ones. With the can body being thinner and accounting for a larger surface area of the can than the end, it may be expected that in shredding used beverage cans the body would produce more fines than would the end. The decreasing magnesium content with finer particle size may also reflect the increased magnesium oxidation incurred when melting the smaller sized material for analysis purposes. The −10 mesh material, both ingoing and exiting, did not contain sufficient metallic material to melt and produce a sample for spectrographic analysis.

Figure 7:
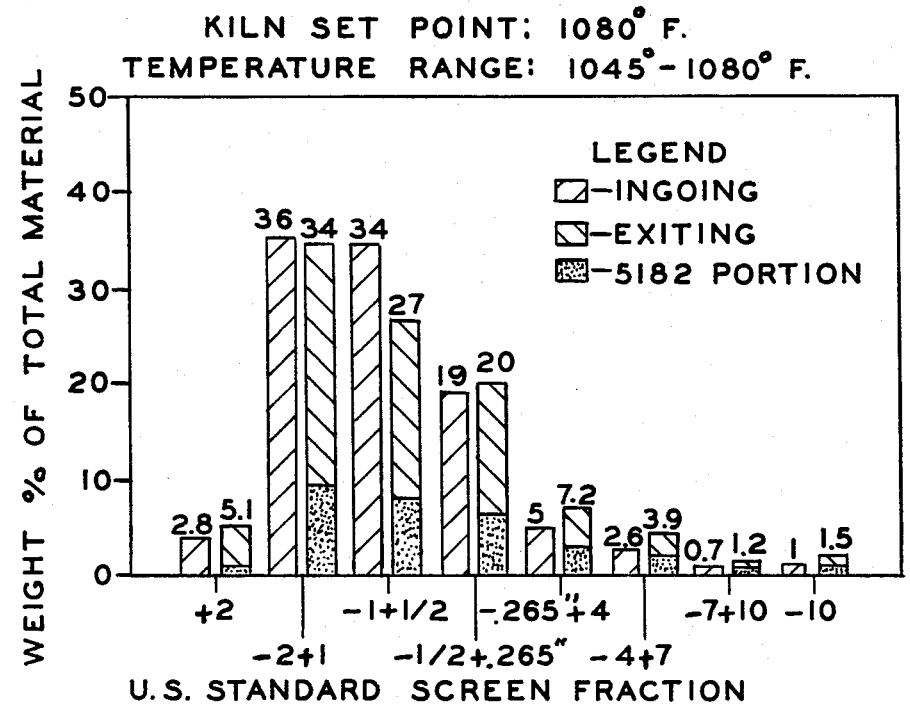
FIG. 7 is a bar graph showing the particle size distribution of material entering and exiting the furnace at a temperature of 1080° F.
Figure 8:
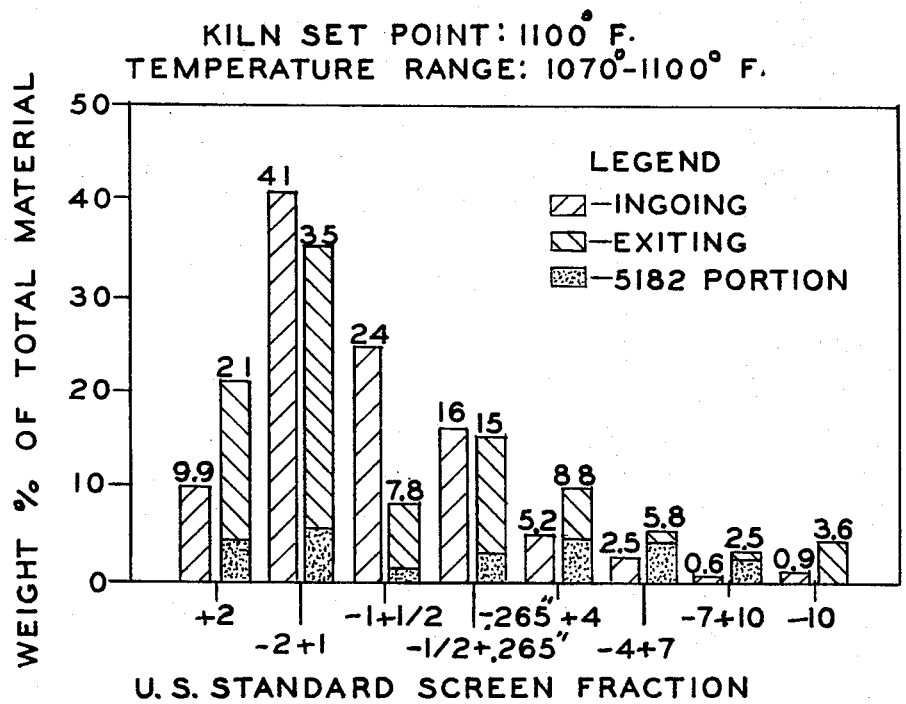
FIG. 8 is a bar graph showing the particle size distribution of material entering and exiting the furnace at a temperature of 1100° F.

The data from samples taken while the kiln set temperature was 1080° and 1100° F. appear in FIGS. 7 and 8 and Tables III and IV, respectively. These samples show fragmentation of AA 5182 lids inside the rotary kiln. Specifically, the amount of material present in the finer mesh fractions in the exiting material is increased when compared to the ingoing material; and these fines have compositions that show AA 5182 enrichment. This trend is more pronounced at 1100° than at 1080° F.

Figure 9:
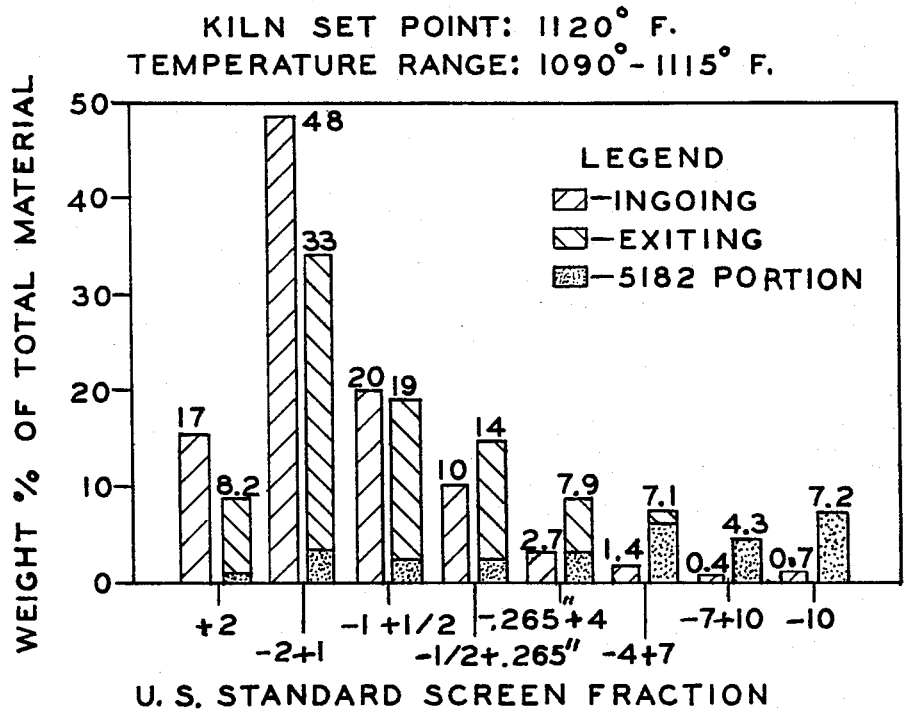
FIG. 9 is a bar graph showing the particle size distribution of material entering and exiting the furnace at a temperature of 1120° F.

The samples taken at 1120° F. show the strongest definitive evidence for AA 5182 fragmentation inside the kiln. The two coarsest fractions have experienced a significant weight reduction after passing through the kiln, and the four finer fractions all show significant weight increase (FIG. 9). The compositions of the fractions (Table V) show that the coarser fractions are nearly commercial grade composition of AA 3004 and that the finer material is nearly the commercial grade composition of AA 5182. Comparing data for the 1060° and 1120° F. experiments shows migration of AA 5182 from the coarse fractions to the fine fractions.

Table V shows that metal from the −10 mesh fraction of the 1120° F. sample contains 0.50% silicon. This is very significant since this fraction represents approximately 30% of the AA 5182 in the system. This material was further screened down to determine the possibility of screening out the tramp silicon contaminants. The results appear in Table VI. The tramp silicon apparently migrates to the −20 mesh fractions. The −25 mesh fraction contained such a large amount of non-metallic material that it could not be melted to prepare a sample for spectrographic analysis. Visual inspection revealed significant quantities of glass and sand. Chemical analysis of the −25 material appears in Table VII. This fraction contains only about 56% metallic aluminum. The sand and glass content is about 23 wt.% and the tramp iron content about 1.7 wt.%. Discarding all −20 mesh material, to minimize tramp silicon and iron pickup, will contribute 2.2% to the system loss. However, this material contributes substantially to skim generation and should be removed prior to melting for this reason.

TABLE I

| Screens Used to Fractionate the Samples | |
|---|---|
| U.S. Standard Screen | Tyler Mesh Equivalent |
| 2 inches | 2 inches |
| 1 inch | 1 inch |
| 0.5 inch | 0.5 inch |
| 0.265 inch | 3 mesh |
| No. 4 | 4 mesh |
| No. 7 | 7 mesh |
| No. 10 | 9 mesh |
| No. 14 | 12 mesh |
| No. 18 | 16 mesh |
| No. 20 | 20 mesh |
| No. 25 | 24 mesh |

TABLE II

Chemical Analyses of Ingoing (IN) and Exiting (OUT) Material For Each Size Fraction. Kiln Set Temperature: 1060° F.

| U.S. Screen | Si | Fe | Cu | Mn | Mg |
|---|---|---|---|---|---|
| +2″ | | | | | |
| IN | .17 | .41 | .11 | .90 | 1.19 |
| OUT | .17 | .41 | .11 | .91 | 1.23 |
| −2″ + 1″ | | | | | |
| IN | .17 | .41 | .11 | .92 | 1.22 |
| OUT | .18 | .40 | .10 | .86 | 1.20 |
| −1″ + ½″ | | | | | |
| IN | .16 | .38 | .10 | .85 | 1.72 |
| OUT | .16 | .39 | .11 | .86 | 1.02 |
| −½″ + 0.265″ | | | | | |
| IN | .17 | .41 | .11 | .91 | 1.19 |
| OUT | .17 | .40 | .11 | .92 | .78 |

TABLE II-continued

Chemical Analyses of Ingoing (IN) and Exiting (OUT) Material For Each Size Fraction. Kiln Set Temperature: 1060° F.

| U.S. Screen | Si | Fe | Cu | Mn | Mg |
|---|---|---|---|---|---|
| −0.265″ + 4 | | | | | |
| IN | .21 | .41 | .12 | 1.00 | .73 |
| OUT | .24 | .42 | .12 | 1.01 | .78 |
| −4 + 7 | | | | | |
| IN | .37 | .45 | .14 | 1.06 | .35 |
| OUT | .26 | .45 | .13 | 1.05 | .68 |
| −7 + 10 | | | | | |
| IN | .24 | .44 | .13 | 1.06 | .26 |
| OUT | .24 | .48 | .13 | 1.03 | .54 |
| −10* | | | | | |
| IN | — | — | — | — | — |
| OUT | — | — | — | — | — |

*Contained insufficient metal content for quantometer analysis.

TABLE III

Chemical Analyses of Size Fractions Exiting the Kiln at a Set Temperature: 1080° F.

| U.S. Screen | Si | Fe | Cu | Mn | Mg |
|---|---|---|---|---|---|
| +2″ | .17 | .39 | .11 | .95 | .96 |
| −2″ + 1″ | .18 | .39 | .10 | .91 | 1.05 |
| −1″ + ½″ | .17 | .39 | .11 | .90 | 1.10 |
| −½″ + 0.265″ | .17 | .39 | .10 | .87 | 1.03 |
| −0.265″ + 4 | .22 | .38 | .10 | .83 | 1.63 |
| −4 + 7 | .18 | .36 | .09 | .73 | 2.08 |
| −7 + 10 | .17 | .32 | .07 | .60 | 2.70 |
| −10 | .23 | .32 | .11 | .55 | 1.54 |

TABLE IV

Chemical Analyses of Size Fractions Exiting the Kiln at a Set Temperature: 1100° F.

| U.S. Screen | Si | Fe | Cu | Mn | Mg |
|---|---|---|---|---|---|
| +2″ | .17 | .41 | .12 | .94 | .48 |
| −2″ + 1″ | .18 | .42 | .12 | .97 | .66 |
| −1″ + ½″ | .19 | .42 | .12 | .98 | .64 |
| −½″ + 0.265″ | .18 | .41 | .12 | .94 | .56 |
| −0.265″ + 4 | .17 | .35 | .09 | .73 | 1.36 |
| −4 + 7 | .15 | .30 | .19 | .56 | 2.57 |
| −7 + 10 | .15 | .29 | .06 | .46 | 2.15 |
| −10* | — | — | — | — | — |

TABLE V

Chemical Analyses of Size Fractions Exiting the Kiln at a Set Temperature: 1120° F.

| U.S. Screen | Si | Fe | Cu | Mn | Mg |
|---|---|---|---|---|---|
| +2″ | .19 | .44 | .13 | 1.05 | .58 |
| −2″ + 1″ | .18 | .43 | .12 | 1.02 | .66 |
| −1″ + ½″ | .18 | .44 | .12 | 1.03 | .67 |
| −½″ + 0.265″ | .18 | .43 | .12 | 1.02 | .57 |
| −0.265″ + 4 | .21 | .37 | .10 | .82 | 1.61 |
| −4 + 7 | .17 | .30 | .07 | .52 | 2.97 |
| −7 + 10 | .18 | .25 | .05 | .36 | 3.43 |
| −10 | .50 | .29 | .07 | .36 | 3.35 |

TABLE VI

Chemical Analyses of Fractions Resulting From Further Fractionation of the Minus 10 Material Exiting the Kiln at Set Temperature 1120° F.

| U.S. Screen | wt. % | Si | Fe | Cu | Mn | Mg |
|---|---|---|---|---|---|---|
| −10 + 14 | 2.6 | .15 | .27 | .04 | .38 | 3.67 |
| −14 + 18 | 1.9 | .16 | .28 | .04 | .38 | 3.82 |
| −18 + 20 | 0.5 | .21 | .26 | .04 | .35 | 3.64 |
| −20 + 25 | 0.4 | .35 | .21 | .05 | .33 | 3.74 |

TABLE VI-continued

Chemical Analyses of Fractions Resulting From
Further Fractionation of the Minus 10 Material
Exiting the Kiln at Set Temperature 1120° F.

| U.S. Screen | wt. % | Si | Fe | Cu | Mn | Mg |
|---|---|---|---|---|---|---|
| −25* | 1.8 | — | — | — | — | — |

*Contained insufficient metal content for quantometer analysis.

TABLE VII

Analysis of Minus 25 Material Exiting
the Kiln at a Set Temperature: 1120° F.

| | |
|---|---|
| % Aluminum by Hydrogen Evolution | 56.2% |
| Chemical Analysis: | |
| Al | 56.7% |
| Fe | 1.74% |
| Si | 10.8% |
| Calculated SiO$_2$ | 23.1% |
| % Magnetic Material | 1.87% |
| X-ray Diffraction: | |
| Aluminum | >10% |
| Quartz | >10% |
| MgO | <10% |
| Unidentified | <10% |

TABLE VIII

Chemical Analyses from Whole Can Experiment
Having 3004 Bodies and 5182 Ends

| | End Fragments | Body Parts |
|---|---|---|
| Si | 0.10 | 0.19 |
| Fe | .25 | .40 |
| Cu | .03 | .14 |
| Mn | .36 | 1.09 |
| Mg | 3.69 | .7 |
| Cr | .02 | .01 |
| Ni | .00 | .00 |
| Zn | .02 | .04 |
| Ti | .01 | .02 |

TABLE IX

| Alloy | Si | Fe | Cu | Mn | Mg | Cr | Zn | Ti | Others Each | Others Total |
|---|---|---|---|---|---|---|---|---|---|---|
| AA3003 | 0.6 | 0.7 | 0.05–0.2 | 1.0–1.5 | — | — | 0.10 | — | 0.05 | 0.15 |
| AA3004 | 0.30 | 0.70 | 0.25 | 1.0–1.5 | 0.8–1.3 | — | 0.25 | — | 0.05 | 0.15 |
| AA3104 | 0.6 | 0.8 | 0.05–0.25 | 0.8–1.4 | 0.1–1.3 | — | 0.25 | 0.10 | 0.05 | 0.15 |

Note: In Table IX, the balance is aluminum, and composition is in wt. % max. unless shown as a range.

TABLE X

| Alloy | Si | Fe | Cu | Mn | Mg | Cr | Zn | Ti | Others Each | Others Total |
|---|---|---|---|---|---|---|---|---|---|---|
| AA5182 | 0.20 | 0.35 | 0.15 | 0.20–0.50 | 4.0–5.0 | 0.10 | 0.25 | 0.10 | 0.05 | 0.15 |
| AA5082 | 0.02 | 0.35 | 0.15 | 0.15 | 4.0–5.0 | 0.15 | 0.25 | 0.10 | 0.05 | 0.15 |
| AA5052 | 0.45 | Si + Fe | 0.10 | 0.10 | 2.2–2.8 | 0.15–0.35 | 0.10 | — | 0.05 | 0.15 |
| AA5042 | 0.20 | 0.35 | 0.15 | 0.20–0.50 | 3.0–4.0 | 0.10 | 0.25 | 0.10 | 0.05 | 0.15 |

Note: In Table X, the balance is aluminum, and composition is in wt. % max. unless shown as a range.

While the invention has been described in terms of preferred embodiments, the claims appended hereto are intended to encompass other embodiments which fall within the spirit of the invention.

What is claimed is:

1. A method of operating a scrap treating furnace to permit segregation of components of metallic scrap therein which comprises:
    (a) feeding into a rotatable furnace metallic scrap comprising at least two metals having different incipient melting temperatures;
    (b) heating said furnace to a temperature sufficient to effect incipient melting of the component having the lowest incipient melting temperature but less than the incipient melting temperature of the component having the higher incipient melting temperature;
    (c) rotating at least a portion of said furnace to agitate said scrap whereby the metal component heated to its incipient melting temperature will fragment into smaller particles;
    (d) removing said scrap from said furnace; and
    (e) segregating said scrap by particle size whereby said metal component having the lowest incipient melting temperature may be separated from the remainder of the scrap because of the fragmentation within said furnace of said metal component having the lowest incipient melting temperature.

2. A method of claim 1 wherein said rotatable furnace comprises a cylinder.

3. The method of claim 2 wherein said furnace is provided with agitation means therein to agitate the scrap as the furnace is rotated to facilitate fragmentation of the metal component heated to its incipient melting temperature.

4. The method of claim 3 wherein said agitation means include projecting means depending from the inner surface of said cylindrical furnace.

5. The method of claim 2 wherein said cylindrical furnace is provided with spiral feed means to move said metallic scrap through said furnace.

6. The method of claim 1 wherein said segregating of said scrap by particle size comprises screening means sized to permit passage therethrough of fragmented particles whereby the fragmented metal scrap component heated to its incipient melting temperature is separated from the unfragmented metal scrap components.

7. The method of claim 6 wherein said segregation of said scrap by particle size further comprises a second screening means to separate fine particles from said fragmented particles whereby dirt and other foreign materials which may be present in said scrap in fine particulate form after passage through said furnace may be separated from said fragmented component.

8. The method of claim 1 wherein said metallic scrap is shredded prior to feeding said scrap into said rotatable furnace.

9. The method of claim 8 wherein said shredded scrap is screened to remove fines therefrom prior to feeding said scrap into said rotatable furnace.

10. The method of claim 1 wherein said scrap comprises more than two metallic components having different incipient melting temperatures and said unfragmented scrap is recycled back to said furnace and said furnace is heated to at least the incipient melting temperature of the metal component remaining in the scrap having the lowest incipient melting temperature, and the process steps are repeated until all of the metal components having different incipient melting temperatures have been segregated from one another.

11. The method in accordance with claim 1 including using feedstock comprised of used food and beverage containers.

12. The method in accordance with claim 11 wherein the feedstock contains containers having a body portion fabricated from AA 3004.

13. The method in accordance with claim 11 wherein the feedstock contains containers having body portions fabricated from an aluminum alloy selected from the group comprising AA 3004, 5042, 3104 and 5052.

14. The method in accordance with claim 11 wherein the feedstock contains containers having body portions fabricated from an aluminum alloy selected from the group comprising AA 3004, 5042, 3104 and 5052 and have ends on said containers fabricated from an aluminum alloy selected from the group comprising AA 5182, 5082, 5052 and 5042.

15. The method in accordance with claim 9 wherein said feedstock contains containers having a body portion fabricated from AA 3004 and a lid portion fabricated from AA 5182 and wherein fines generated from shredding said feedstock contain from 75 to 95 wt.% AA 3004.

16. The method of claims 11, 12, 13, 14 or 15 wherein said scrap is heated to a temperature of from 1077° to 1155° F.

17. The method of claim 16 wherein said scrap is heated to a temperature of from 1077° to 1130° F.

18. The method of claim 17 wherein said scrap is maintained at said temperature in said furnace for a time of from 30 seconds to less than 10 minutes.

19. A process for separation of metallic scrap components having different incipient melting temperatures in a rotatable furnace comprising a substantially horizontal cylinder having projecting means therein to provide agitation of said scrap components and means for urging passage of said scrap through said furnace comprising:
 (a) feeding said metallic scrap components into a rotatable furnace;
 (b) heating said furnace to effect incipient melting of the component having the lowest incipient melting temperature without melting other components present in the scrap;
 (c) rotating said furnace to cause said projecting means to agitate said scrap component sufficiently to fragment said metallic scrap component having the lowest incipient melting temperature;
 (d) removing said scrap components from said furnace; and
 (e) segregating said fragmented component from the remainder of said metallic scrap.

20. A process of operating a rotatable furnace to fragment and segregate shredded metallic containers fabricated from different aluminum alloys having different incipient melting temperatures in which a fragmented component is provided comprising the steps of:
 (a) shredding said containers;
 (b) screening said shredded containers and removing 1 to 15 wt.% of said containers as fines therefrom, the fines having at least sizes in a size range of the fragment component;
 (c) feeding said shredded containers into a rotatable furnace;
 (d) heating the furnace sufficiently to effect incipient melting of the component having the lowest incipient melting temperature without effecting incipient melting of other components in the scrap;
 (e) rotating at least a portion of said furnace to agitate said heated containers sufficiently to cause said component having the lowest incipient melting temperature to fragment; and
 (f) segregating said fragmented components from the unfragmented containers.

21. The process of claim 20 wherein fines produced during said fragmentation are separated from said fragmented component.

* * * * *